United States Patent [19]

Ono et al.

[11] Patent Number: 4,822,670

[45] Date of Patent: Apr. 18, 1989

[54] REMOVABLE ADHESIVE SHEET OR TAPE

[75] Inventors: Kiyoshi Ono, Nagoya; Yasuo Sakurai, Chiryu; Yoshio Kishimoto, Anjo; Hiroyasu Miyasaka, Tanashi; Yasuaki Kitazaki, Iruma; Tetsuaki Matsuda, Kawagoe; Junichi Kobayashi, Tokorozawa, all of Japan

[73] Assignee: Nichiban Company Limited, Tokyo, Japan

[21] Appl. No.: 904,292

[22] Filed: Sep. 8, 1986

[30] Foreign Application Priority Data

Dec. 18, 1985 [JP] Japan .................................. 60-282779
Dec. 25, 1985 [JP] Japan .................................. 60-290688

[51] Int. Cl.[4] .............................. B32B 5/22; C09J 7/02
[52] U.S. Cl. ................................ 428/317.3; 428/317.5; 428/353; 428/327; 524/813; 526/307
[58] Field of Search ............... 428/314.4, 319.7, 317.3, 428/353; 524/813; 526/307

[56] References Cited

U.S. PATENT DOCUMENTS

| 3,312,563 | 4/1967 | Rusch | 428/353 X |
| 3,691,140 | 9/1972 | Silver | 260/78.5 |
| 3,857,731 | 12/1974 | Merrill, Jr. et al. | 428/314.4 |
| 4,112,177 | 9/1978 | Salditt et al. | 428/317.3 X |
| 4,223,067 | 9/1980 | Levens | 428/317.3 X |
| 4,563,388 | 1/1986 | Bonk et al. | 428/317.3 X |

FOREIGN PATENT DOCUMENTS 54-60661 4/1979 Japan .
55-42881 9/1980 Japan .
57-57394 12/1982 Japan .

Primary Examiner—George F. Lesmes
Assistant Examiner—M. A. Katz
Attorney, Agent, or Firm—Foley & Lardner, Schwartz, Jeffery, Schwaab, Mack, Blumenthal & Evans

[57] ABSTRACT

Disclosed is a removable adhesive sheet or tape which comprises adhesive fine particles attached on at least one side of a substrate through a primer resin layer comprising at least one selected from the group consisting of a poly (vinylidene chloride) resin, a poly (vinyl acetate) resin having a polymerization degree of 400 or more, a polyamide resin having a melting point of 80° C. or less, a poly (vinyl chloride-vinyl acetate) type resin, a phenol-modified epoxy resin and a maleated natural rubber.

According to the present invention, a removable adhesive sheet or tape which is excellent in removability even after frequent repetition of bonding to and removal from an adherend can be obtained.

25 Claims, No Drawings

REMOVABLE ADHESIVE SHEET OR TAPE

BACKGROUND OF THE INVENTION

The present invention relates to a removable adhesive sheet or tape which is excellent in removability, more particularly to a removable adhesive sheet or tape which is excellent in removability even after frequent repetition of bonding to and removal from an adherend, and does not permit adhesive fine particles to remain on the surface of the adherend.

There are known removable adhesive tapes or sheets using adhesive fine particles as a constituent element. However, in those conventional removable adhesive tapes, there is a problem that fine particles which are adhesive components remain on an adherend when bonded to and removed from the adherend. This problem becomes more remarkable when the adherend is a diazo copying paper.

There is a removable adhesive tape in which a binder is used in an amount of approximately ½ to 1/5 as much as the weight of adhesive fine particles to adhere the fine particles onto a substrate, for the purpose of resolving the problem as described above [see, for example, West German Patent No. 24 17 312 (corresponding to U.S. Pat. No. 3,857,731) and Japanese Unexamined Published Utility Model Application Nos. 60661/1979 and 42881/1980].

However, even when a binder is used as described above, adhesion or fixation of fine particles on a substrate is still not sufficient, and when an abrupt removal is effected, there still exists a problem that fine particles remain on an adherend.

Further, there has been proposed a method in which a pressure sensitive adhesive (hereinafter referred to as an adhesive) such as an acrylic emulsion type adhesive, etc., is used as a binder in order to adhere or attach fine particles more securely on a substrate (see U.S. Pat. No. 3,857,731).

However, in this method, a new problem has been raised that, in addition to insufficient attachment of fine particles onto a substrate, not only the fine particles but also the adhesive used as a binder remain on an adherend. Further, in this method, there is a fear that the so-called picking would be generated.

Also there has been known an invention in which adhesive fine particles having a shape which is approximately semi-spherical are attached onto a primer resin layer provided on a substrate without any use of a binder (see Japanese Examined Published Utility Model Application No. 57394/1982).

However, in this invention, the fine particles are limited to ones having an approximately semi-spherical shape, and also it is essential that these fine particles are attached to a substrate in such a state that the curved surface thereof is necessarily positioned at the outer side, i.e., the substrate and the fine particles are brought into contact with each other so as to make the contact area therebetween to be larger.

SUMMARY OF THE INVENTION

The object of the present invention is to resolve the above described problem that the fine particles remain on an adherend when freqeuent repetition of bonding to and removal from the adherend are effected.

The present inventors have made extensive studies in order to resolve the above problem, and as a result, found that by using a primer resin layer capable of being bonded specifically to the adhesive fine particles, a substrate and the adhesive fine particles can be bonded more securely to each other even if a binder is not used and a contact area therebetween is extremely small, while in conventional removable adhesive sheets or tapes employing fine particles, the fine particles are attached onto a substrate by the use of a binder or by making a contact area between a primer resin layer and the fine particles to be larger (see, for example, the above described Japanese Examined Published Utility Model No. 57394/1982), and have accomplished the present invention.

Namely, the removable adhesive sheet or tape of the present invention comprises adhesive fine particles attached on at least one side of a substrate through a primer resin layer comprising at least one selected from the group consisting of a poly (vinylidene chloride) resin, a poly (vinyl acetate) resin having a polymerization degree of 400 or more, a polyamide resin having a melting point of 80° C. or less, a poly (vinyl chloride-vinyl acetate) type resin, a phenol-modified epoxy resin and a maleated natural rubber.

DETAILED DESCRIPTION OF THE PREFERRED EMBODIMENTS

The primer resin layer which is a constituent element of the present adhesive sheet or tape is composed of a primer resin comprising at least one substance selected from the group consisting of a poly (vinylidene chloride) resin, a poly (vinyl acetate) resin having a polymerization degree of 400 or more, a polyamide resin having a melting point of 80° C. or less, a poly (vinyl chloride-vinyl acetate) type resin, a phenol-modified epoxy resin and a maleated natural rubber.

Any of these resins is one which can be securely bonded to the adhesive fine particles through a specific mutual interaction therebetween, and among them, the poly (vinylidene chloride) resin is particularly preferable.

In one of the preferred embodiments, the primer resin layer comprises a poly (vinyl chloride-vinyl acetate) type resin in combination with an inorganic pigment and more preferably the primer resin layer consists of 35 to 15 % by weight of poly (vinyl chloride-vinyl acetate) type resin and 65 to 85 % by weight of the inorganic pigment.

As the poly (vinyl chloride-vinyl acetate) type resin, which can be one component of the primer resin, there may preferably be mentioned one having a glass transition temperature of 50° C. or more, and a polymerization degree of 100 or more, more preferably, 300 or more. This resin may be a copolymer which comprises 85 to 98 % by weight of vinyl chloride and 15 to 2 % by weight of vinyl acetate, and optionally may contain 0 to 10 % by weight of poly (vinyl alcohol).

As the inorganic pigment, there may be mentioned zinc oxide, titanium dioxide, silica, calcium carbonate, clay, basic lead carbonate, magnesium oxide and the like, and they may be used alone or in combination with two or more.

The formulation ratio of the poly (vinyl chloride-vinyl acetate) type resin to the inorganic pigment in the primer resin in preferably 15 to 35 % by weight/85 to 65 % by weight, more preferably 20 to 30 % by weight/80 to 70 % by weight. When the formulation ratio of the resin is less than 15 % by weight, there is the possibility that the pigment partially fails to be mixed with the resin resulting in a part comprising only the pigment. Thus, not only a homogeneous primer resin can not be obtained but also the adhesion force thereof is drastically lowered and the adhesive fine particles on the primer resin layer are possibly peeled off when scratched or bended. On the other hand, when the formulation ratio of the resin exceeds 35 % by weight, adhesion or anchoring of the adhesive fine particles is impaired to cause removal of fine particles.

In the present invention, to the primer resin, if desired, there may be added a water proof agent, a stabilizer, a barrier effect improver, an anti-blocking agent, dyes, etc., so long as the characteristics thereof is not impaired.

Also, to the primer resin, various kinds of an inorganic or organic loading pigment or coloring pigment may be added, if desired, so long as the effect of the primer resin is not impaired.

The primer resin layer may be formed by adding the primer resin to an organic solvent, followed by kneading, mixing and dissolving, and applying the resulting solution onto at least one side of a substrate.

As the organic solvent to be used in this invention, there may be mentioned an alcohol such as methyl alcohol, butyl alcohol and the like; a ketone such as acetone, methyl ethyl ketone and the like; an aliphatic or aromatic hydrocarbon such as n-hexane, cyclohexane, n-heptane, mineral spirit, toluene, xylene and the like; an ester such as ethyl acetate, butyl acetate and the like, and these solvents can be used in combination with one or more.

The primer resin may be kneaded, mixed or dissolved into a solvent by use of a ball mill, a sand mill, a three-roll mill or the like, after adding the primer resin to an organic solvent.

For enhancement of the kneading effect, it is preferable to control the concentration of the total solid components in the primer resin solution at 30 % by weight when a ball mill or a sand mill is used, and at 30 % by weight or more when a three-roll mill is used. The resulting primer resin has preferably a standard viscosity of 1 to 1,000 cp (20 ° C., the concentration of the total solid components: 30 % by weight). Then, the primer resin solution thus obtained is applied on at least one side of a substrate to form a primer resin layer.

As the substrate to be used in this invention, there may be mentioned, in addition to a fibrous substrate such as paper, nonwoven fabric, etc., for example, a smooth film or sheet made of polyethylene, polypropylene, polyester, polyvinyl chloride, cellulose acetate, polycarbonate, cellophane, polyvinylidene fluoride or a composite substrate thereof.

The application of the primer resin on the substrate may be carried out by, for example, a gravure coater, a wire-wound coating bar, a roller coater, an air knife coater or the like.

The primer resin layer after application has preferably a thickness of approximately 1 to 10 $\mu$m, and more preferably of 1 to 5 $\mu$m.

After formation of the primer resin layer as described above, drying is effected at a temperature of 50 to 120 ° C. for 20 to 300 seconds. On this primer resin layer, adhesive fine particles comprising poly (meth)acrylic ester resin are applied and attached.

The adhesive fine particles of the present invention are a copolymer comprising a (meth)acrylic ester as a main component, and can be prepared by using a (meth)acrylic ester, or a (meth)acrylic ester and a vinyl type monomer containing a functional group, according to a known method, for example, the suspension polymerization method as disclosed in U.S. Pat. No. 3,691,140.

As a (meth)acrylic ester for providing fine particles having adhesiveness at room temperature, there may preferably be employed those capable of producing a polymer typically having a glass transition temperature of not higher than 10 ° C., more preferably not higher than 0 ° C. The (meth)acrylic ester as described above may include usually a (meth)acrylic ester having a straight or branched alkyl group having 2 to 12 carbon atoms, as exemplified by butyl (meth)acrylate, isobutyl (meth)acrylate, sec-butyl (meth)acrylate, hexyl (meth)acrylate, heptyl (meth)acrylate, 2-ethylhexyl (meth)acrylate, isooctyl (meth)acrylate, isononyl (meth)acrylate, decyl (meth)acrylate, methyl (meth)acrylate, tetradecyl (meth)acrylate, hexadecyl (meth)acrylate, stearyl (meth)acrylate and the like, and these esters can be used in combination with one or more.

In the case where the fine particles of this kind described above are used as an adhesive, in order to enhance the cohesive strength of the fine particles, namely, in order to prevent the adhesive from remaining on the adherent owing to a phenomenon of the so-called "stringiness" upon removal from the adherend, there may be further added vinyl acetate, styrene, acrylonitrile, methacrylonitrile and the like in an amount of 50 % by weight or less relative to the weight of the alkyl (meth)acrylic ester monomer.

The vinyl type monomer containing a functional group to be copolymerized with a (meth)acrylic ester may include a mononer which has, in its molecule, a carboxylic group, a hydroxy group, an amino group, a glycidyl group, a methylol group, a formyl group, a mercapto group, etc. or an acid anhydride. As the vinyl type monomer described above, there may be mentioned, for example, (meth)acrylic acid, hydroxyethyl (meth)acrylate, hydroxypropyl (meth)acrylate, glycidyl (meth)acrylate, N-methylol (meth)acrylamide, N-butoxymethyl (meth)acrylamide, (meth)acrylamide, maleic anhydride, etc.

The fine particles have preferably an average particle size of 1 to 150 $\mu$m, more preferably 5 to 100 $\mu$m. The shape of the particle is not particularly limited but it should preferably be spherical in view of enhancement of the removability effect.

Application of the fine particles onto the primer resin layer may be effected by dispersing the fine particles in an organic solvent such as n-hexene, n-heptane, toluene, xylene, ethyl acetate, butyl acetate, 1,1,1-trichloroethane, etc., and then applying the resulting dispersion according to a usual coating method by a knife coater, a reverse roll coater, a gravure coater or a screen printing machine, or by a spray method.

In this case, the application amount of the fine particles dispersion should be 0.1 to 100 g/m$^2$, preferably 0.1 to 30 g/m$^2$, more preferably 1 to 10 g/m$^2$ in terms of the weight thereof after drying.

Thus, the adhesive fine particles are applied and attached to the primer resin layer and then dried at 60 to 120 ° C. for 30 to 300 seconds to obtain the pressure-sensitive removable adhesive sheet or tape (hereinafter referred to as a removable adhesive sheet or tape) according to the present invention.

As described above, in the removable adhesive sheet or tape of the present invention, the primer resin layer provided on a substrate and adhesive fine particles are securely bonded to each other without the use of a binder, thereby excellent adhesive property to an adherend can be retained. At the same time, the present removable adhesive sheet or tape has such an excellent removability that no adhesive fine particles remain on an adherend, even if frequent repetition of bonding and removal is made, or even if an abrupt removal is carried out.

Thus, no contamination of the surface of an adherend occurs, even if an adherend is composed of a transparent material such as plastics or the like, and also the so-called "picking", which may possibly occur when an adherend is paper such as a diazo copying paper or the like, can not be observed.

Further, in the present removable adhesive sheet or tape, since no binder is used, shortening of the production time and lowering of the production cost can be attained.

Next, the present invention will be explained in more detail by referring to the Examples.

EXAMPLE 1

Preparation of Primer Resin Solution

The following components described below were homogeneously dispersed by using a sand mill to obtain a primer resin solution.

| | |
|---|---|
| Poly (vinylidene chloride) resin | 150 g |
| Toluene | 430 g |
| Ethyl acetate | 420 g |

Preparation of Adhesive Fine Particles

Into a 1.5 liter four-necked flask equipped with a thermometer, a reflux condensor, a stirrer and an inlet for nitrogen gas, 370 g of deionized water, 108 g of isononyl acrylate, 4 g of acrylic acid, 2 g of sodium dodecylbenzene-polyoxyethylene sulfonate and 0.37 g of benzoyl peroxide were charged. Then while stirring the system, nitrogen gas was introduced through the inlet for nitrogen gas for about 30 minutes to replace the air in the system with nitrogen gas. Subsequently, while further introducing nitrogen gas, the mixture in the system was heated and stirred at 66° C. for 20 hours to obtain a dispersion containing a suspension polymer.

After the resulting suspension polymer was separated from the dispersion, about 500 ml of methanol was added thereto to coagulate the polymer, which was then washed with isopropanol and subsequently dispersed in n-hexane to obtain a dispersion containing spherical adhesive fine particles( solid content: about 8 % by weight).

Preparation of Removable Adhesive Sheet

The primer resin solution prepared above was applied with an applicator on one side of paper having a size of 21×43 cm at a rate of about 3 g/m², followed by drying at 100° C. for one minute to form a primer resin layer. Then, the dispersion containing adhesive fine particles prepared above was applied on the primer resin layer described above so that the thickness of the layer may be about 10 μm, according to a screen application method. The thus formed primer resin layer was dried at 100° C. for one minute to prepare the removable adhesive sheet of the present invention.

The removable adhesive sheet thus obtained was bonded to a slide glass, rubbed strongly on the backing of the sample sheet with fingers ten times and then abruptly peeled from the slide glass. No fine particles remained. The surface of the slide glass was not contaminated at all and could not be distinguished from a slide glass which had not been subjected to a test.

The same test was carried out by using a diazo copying paper, and as a result, the fine particles were not observed to remain on the surface of the diazo copying paper and only a small part of the surface layer of the diazo copying paper was slightly peeled off.

EXAMPLE 2

Preparation of Primer Resin Solution

The following components described below were homogeneously dispersed by using a sand mill to obtain a primer resin solution.

| | |
|---|---|
| Polyamide resin V' #940 (produced by Nippon Henkel Co. Ltd.) | 200 g |
| Toluene | 400 g |
| Isopropanol | 400 g |
| Calcium carbonate | 250 g |

Preparation of Removable Adhesive Sheet

The primer resin solution was applied with an applicator on one side of woodfree paper having a size of 21×43 cm at a rate of about 5 g/m², followed by drying at 100° C. for one minute to form a primer resin layer.

Subsequently, the dispersion containing the adhesive fine particles obtained in Example 1 was applied on the primer resin layer obtained above and dried in the same manner as in Example 1 to obtain the removable adhesive sheet of the present invention.

By using the thus obtained removable adhesive sheet, the same test was carried out in the same manner as in Example 1.

As a result, no fine particles remained on a slide glass. In the case where diazo copying paper was used, a small part of the surface layer thereof was slightly peeled off when the removable adhesive sheet was removed abruptly, but no fine particles were observed to remain on the diazo copying paper.

EXAMPLE 3

Preparation of Primer Resin Solution

The following components described below were homogeneously dispersed by using a sand mill to obtain a primer resin solution.

| | |
|---|---|
| Poly (vinyl acetate) resin (polymerization degree: 500) | 100 g |
| Toluene | 150 g |
| Ethyl acetate | 150 g |
| Anatase type titanium dioxide | 120 g |

Preparation of Removable Adhesive Sheet

The primer resin solution was applied with an applicator on one side of woodfree paper having a size of 15×43 cm at a rate of abou 5 g/m², followed by drying at 100° C. for one minute to form a primer resin layer.

Subsequently, the dispersion containing the adhesive fine particles obtained in Example 1 was applied on the primer resin layer obtained above and dried in the same manner as in Example 1 to obtain the removable adhesive sheet of the present invention.

By using the thus obtained removable adhesive sheet, the same test was carried out in the same manner as in Example 1.

As a result, no fine particles remained on a slide glass. In the case where diazo copying paper was used, a small part of the surface layer thereof was slightly peeled off, when the adhesive was removed abruptly, but no fine particles were observed to remain on the diazo copying paper.

EXAMPLE 4

Preparation of Primer Resin Solution

The following components described below were homogeneously dispersed by using a sand mill to obtain a primer resin solution.

| | |
|---|---|
| Phenol-modified epoxy resin | 200 g |
| Toluene | 400 g |
| Ethyl acetate | 400 g |
| Anatase type titanium dioxide | 240 g |

Preparation of Removable Adhesive Sheet

The primer resin solution was applied with an applicator on one side of reclaimed paper having a size of 15×43 cm at a rate of abou 5 g/m², followed by drying at 100° C. for one minute to form a primer resin layer.

Subsequently, the dispersion containing the adhesive fine particles obtained in Example 1 was applied on the primer resin layer obtained above and dried in the same manner as in Example 1 to obtain the removable adhesive sheet of the present invention.

By using the thus obtained removable adhesive sheet, the same test was carried out in the same manner as in Example 1.

As a result, no fine particles remained on a slide glass. In the case where diazo copying paper was used, a small part of the surface layer thereof was slightly peeled off, when the adhesive was removed abruptly, but no fine particles were observed to remain on the diazo copying paper.

COMPARATIVE EXAMPLE 1

The same suspension polymer as obtained when fine particles were prepared in Example 1, and as a binder an emulsion type adhesive comprising 95.5 % by weight of isooctyl acrylate and 4.5 % by weight of acrylic acid were mixed at such a manner that the ratio of respective solid weights is 3 : 1. To the resulting mixture, 500 ml of methanol was added to coagulate the polymer, which was then washed with isopropanol and subsequently dispersed in n-hexane to obtain an adhesive dispersion.

Subsequently, the resulting adhesive was applied on a substrate, which was the same as in Example 1, and dried in the same manner as in Example 1 to obtain a comparative removable adhesive sheet.

By using the thus obtained removable adhesive sheet, the same test was carried out in the same manner as in Example 1.

As a result, both the binder and the fine particles remained on a slide glass when the removable adhesive sheet was removed abruptly. In the case where diazo copying paper was used, a considerable part of the surface layer thereof was peeled off, and both the binder and the adhesive particles were observed to remain on the diazo copying paper when the removable adhesive sheet was removed abruptly.

EXAMPLE 5

Preparation of Removable Adhesive Sheet

Into 70 parts by weight of ethyl acetate were dissolved 6 parts by weight of a poly (vinyl chloride-vinyl acetate) type resin comprising 91 parts by weight of vinyl chloride, 3 parts by weight of vinyl acetate and 6 parts by weight of polyvinyl alcohol (produced by Denkikagaku Industries Co.,:Trade name : Denka-vinyl #1000 GKT). After addition of 24 parts of weight of zinc oxide thereto, the resulting mixture was stirred in a sand mill for 10 minutes, which was applied on one side of woodfree paper having a basis weight of 70 g/m² by use of a gravure coater so that the thickness of the layer may be 1 μm. Further, on the thus applied paper, adhesive fine particles having an average particle size of 50 μm prepared by suspension polymerization in Example 1 was further applied by means of a screen printing machine so that the spread thereof after drying may be 10 g/m².

The thus obtained removable adhesive sheet was cut into a piece having a width of 25 mm, and then was pressure-adhered onto a diazo copying paper by one reciprocatory movement of a roll weighing 5 kg. After one hour, the sheet was removed in a direction of 180 degree to the surface thereof at a removing rate of 10 cm/min, to result in no picking of the paper and no adhesive residue on the paper. The adhesion force of this removable adhesive sheet was measured to be 250 g/25 mm.

EXAMPLE 6

Preparation of Removable Adhesive Sheet

Into 70 g of a mixed solution comprising toluene and acetic acid (ratio 1:1) was dissolved 9 g of a vinyl chloride-vinyl acetate type resin (Denka-lac #21, produced by Denkikagaku Industries Co.). Then 21 g of rutile type titanium dioxide was added thereto and the resulting mixture was mixed and pulverized in a ball mill for 12 hours. Application was by means of a wire-wound coating bar on a polyester film having a thickness of 25 μm so that the thickness of the layer may be 1 μm. Further, the adhesive fine particles similar to ones in Example 1 was applied thereon by means of a knife coater so that the spread thereof after drying may be 8 g/ m² to obtain the removable adhesive sheet of the present invention.

By using the thus obtained removable adhesive sheet, the adhesion test was carried out in the same manner as in Example 5.

As a result, no picking of the paper and also no adhesive residue were observed on the diazo copying paper. The adhesion force was measured to be 220g/25 mm.

COMPARATIVE EXAMPLE 2

A 10 % ethyl acetate solution of a poly (vinyl chloride-vinyl acetate) type resin (Trade name: Denka-lac #1000 GKT, produced by Denkikagaku Industries Co.) was applied by means of a wire-wound coating bar on woodfree paper having a basis weight of 70 g/m² so that the thickness of the layer may be 1.5 μm. Further, the adhesive fine particles used in Example 1 were applied thereon by means of a screen printing machine so that the spread after drying may be 10 g/m², to obtain a comparative removable adhesive sheet.

By using the thus obtained removable adhesive sheet, the adhesion test was carried out in the same manner as in Example 5, and it is recognized that the adhesive fine particles remained over the whole surface of the diazo copying paper after the removable adhesive sheet was removed. The adhesion force was measured to be 150 g/ 25 mm.

We claim:

1. A removable adhesive sheet or tape which consists essentially of adhesive fine particles attached on at least one side of a substrate through a primer resin layer comprising at least one selected from the group consisting of a poly resin, a poly resin having a polymerization degree of 400 or more and an inorganic pigment, a polyamide resin having a melting point of 80° C. or less and an inorganic pigment, a poly (vinyl chloridevinyl acetate) type resin and an inorganic pigment, and a maleated natural rubber and an inorganic pigment.

2. The removable adhesive sheet or tape according to claim 1, wherein said primer resin layer comprises a poly (vinyl chloride-vinyl acetate) type resin in combination with an inorganic pigment.

3. The removable adhesive sheet or tape according to claim 2, wherein said primer resin layer consists of 35 to 15 % by weight of poly (vinyl chloride-vinyl acetate) type resin and 65 to 85 % by weight of an inorganic pigment.

4. The removable adhesive sheet or tape according to claim 3, wherein the poly (vinyl chloride-vinyl acetate) type resin comprises 85 to 98 % by weight of vinyl chloride and 15 to 2 by weight % of vinyl acetate.

5. The removable adhesive sheet or tape according to claim 4, wherein the poly (vinyl chloride-vinyl acetate) type resin further contains poly (vinyl alcohol) in an amount of 0 to 10 % by weight.

6. The removable adhesive sheet or tape according to claim 3, wherein the inorganic pigment is one selected from the group consisting of zinc oxide, titanium dioxide, silica, calcium carbonate, clay, basic lead carbonate and magnesium oxide.

7. The removable adhesive sheet or tape according to claim 3, wherein the adhesive fine particles are a copolymer comprising 90 to 100 % by weight of an acrylic ester or a methacrylic ester and 0 to 10 % by weight of a vinyl type monomer containing a functional group.

8. The removable adhesive sheet or tape according to claim 3, wherein the adhesive fine particles have a particle size ranging between 1 and 150 μm.

9. The removable adhesive sheet or tape according to claim 3, wherein the adhesive fine particles have a glass transition temperature of 10 ° C. or less.

10. The removable adhesive sheet or tape according to claim 3, wherein the adhesive fine particles are spherical.

11. The removable adhesive sheet or tape according to claim 3, wherein the substrate is paper.

12. The removable adhesive sheet or tape according to claim 1, wherein the adhesive fine particles are a copolymer comprising an acrylic ester or a methacrylic ester as a main component.

13. The removable adhesive sheet or tape according to claim 12, wherein the acrylic ester is one selected from the group consisting of n-butyl acrylate, isobutyl acrylate, 2-ethylhexyl acrylate, isooctyl acrylate and isononyl acrylate and the methacrylic ester is one selected from the group consisting of n-butyl methacrylate, isobutyl methacrylate, 2-ethylhexyl methacrylate, isooctyl methacrylate and isononyl methacrylate.

14. A removable adhesive sheet or tape according to claim 12, wherein the adhesive fine particles are bound to the substrate by point contact with the primer resin.

15. The removable adhesive sheet or tape according to claim 1, wherein the adhesive fine particles are a copolymer comprising 90 to 100 % by weight of an acrylic ester or a methacrylic ester and 0 to 10 % by weight of a vinyl type monomer containing a functional group.

16. The removable adhesive sheet or tape according to claim 15, wherein the vinyl type monomer containing a functional group is one selected from the group consisting of (meth)acrylic acid, hydroxyethyl (meth)acylate, hydroxypropyl (meth)acrylate, glycidyl (meth)acrylate, N-methylol (meth)acrylamide, N-butoxymethyl (meth)acrylamide, (meth)acrylamide or maleic anhydride.

17. The removable adhesive sheet or tape according to claim 1, wherein the adhesive fine particles have a particle size ranging between 1 and 150 μm.

18. The removable adhesive sheet or tape according to claim 11, wherein the adhesive fine particles have a particle size ranging between 5 and 100 μm.

19. A removable adhesive sheet or tape according to claim 17, wherein the thickness of the primer resin layer is of the order of 1 micron and the adhesive fine particles are bound to the substrate by point contact with the primer resin.

20. A removable adhesive sheet or tape according to claim 18, wherein the thickness of the primer resin layer is of the order of 1 micron and the adhesive fine particles are bound to the substrate by point contact with the primer resin.

21. The removable adhesive sheet or tape according to claim 1, wherein the adhesive fine particles have a glass transition temperature of 10 ° C. or less.

22. The removable adhesive sheet or tape according to claim 1, wherein the adhesive fine particles are spherical.

23. The removable adhesive sheet or tape according to claim 1, wherein the substrate is paper.

24. A removable adhesive sheet or tape according to claim 1, wherein the thickness of the primer resin layer if of the order of 1 micron.

25. A removable adhesive sheet or tape according to claim 24, wherein the adhesive fine particles are bound to the substrate by point contact with the primer resin.

* * * * *